United States Patent [19]

Mishra et al.

[11] 4,182,966
[45] Jan. 8, 1980

[54] VENTILATION SYSTEM FOR DYNAMOELECTRIC MACHINES

[75] Inventors: Anil K. Mishra; Joel B. Hammer, both of Pittsburgh; Kenneth M. Sochats, Monroeville, all of Pa.

[73] Assignee: Westinghouse Electric Corp., Pittsburgh, Pa.

[21] Appl. No.: 827,044

[22] Filed: Aug. 23, 1977

Related U.S. Application Data

[63] Continuation of Ser. No. 587,790, Jun. 16, 1975, abandoned.

[51] Int. Cl.² .............................................. H02K 9/00
[52] U.S. Cl. ...................................... 310/59; 310/269
[58] Field of Search .................... 310/60, 52, 53, 54, 310/55, 57, 61, 64, 65, 157, 59, 269

[56] References Cited

U.S. PATENT DOCUMENTS

| | | | |
|---|---|---|---|
| 730,401 | 6/1903 | Rateau | 310/60 |
| 2,917,644 | 12/1959 | Laffoon | 310/64 |
| 3,116,429 | 12/1963 | Harrington | 310/64 |
| 3,588,557 | 6/1971 | Kilgore | 310/269 |
| 3,597,645 | 8/1971 | Duffert | 310/54 |
| 3,675,056 | 7/1972 | Lenz | 310/59 |
| 4,028,569 | 7/1977 | Towne | 310/64 |

FOREIGN PATENT DOCUMENTS

| | | | |
|---|---|---|---|
| 204998 | 5/1907 | Fed. Rep. of Germany | 310/58 |
| 656972 | 6/1928 | France | 310/58 |

Primary Examiner—R. Skudy
Attorney, Agent, or Firm—G. H. Telfer

[57] ABSTRACT

A ventilation system is provided for dynamoelectric machines such as hydro generators having salient pole rotors and in which the rotor and stator have separate ventilation systems sealed from the air gap. The stator ventilation system includes radial vent ducts with longitudinal ducts in the stator core extending between adjacent radial vent ducts. The longitudinal ducts are sealed from the air gap and are disposed in the region of the stator windings, preferably extending through the teeth. Ventilating air flows radially inward through the vent ducts, longitudinally through the longitudinal ducts from one vent duct to the next, and radially outward to the external circuit where it is circulated through coolers, by means of a blower or otherwise.

4 Claims, 6 Drawing Figures

VENTILATION SYSTEM FOR DYNAMOELECTRIC MACHINES

This is a continuation of application Ser. No. 587,790 filed June 16, 1975, now abandoned.

BACKGROUND OF THE INVENTION

The present invention relates to a ventilation system for dynamoelectric machines, and more particularly to cooling the stators of large machines such as hydro generators.

Hydro or waterwheel generators are vertical machines of large physical size with salient pole rotors, and rotate at relatively low speeds as compared to other types of generators although the peripheral speed of the rotor may be quite high because of the large diameter. These machines are cooled by circulation of air and two types of cooling systems have conventionally been used. In one system, the air is circulated by a blower, which may be mounted on the rotor, and is directed to flow axially through the spaces between the salient poles of the rotor. The air flows axially in the interpolar spaces to cool the field windings and poles and then flows radially into the air gap and across the air gap to the stator. The stator core has radial vent ducts extending through it and the cooling air crossing the air gap flows through these ducts to cool the stator windings and core, and is discharged at the back or outer periphery of the core and recirculated after flowing through coolers. The other cooling system, which has come into use more recently, uses the rotor spider and rim as a blower to cause the air to flow radially through ducts in the rotor rim and thus into the interpolar spaces from which it flows radially across the air gap and through the stator core radial vent ducts as described above. In both of these schemes, therefore, the air rotates with the rotor as it flows into and across the air gap. Furthermore, the same air flows in series through the rotor and the stator core, and the mass flow rate of air must be adequate to cool both the rotor and stator sufficiently to keep the temperature rise within the required limits. Thus, a large flow of air is necessary and the rotation of this large mass of air at or near the peripheral speed of the rotor results in high windage losses.

The present trend in hydro machines, especially in those intended for alternative operation as generators and as motors in pumped storage installations, is to machines of large size and relatively high speed. The combination of large rotor diameter and high speed results in very high peripheral velocities of the rotor which may be in excess of 15,000 feet per minute, for example. With the conventional ventilation schemes discussed above, the windage loss is quite high and becomes a relatively large percentage of the total loss in the machine. A reduction in the windage loss therefore can result in a very substantial reduction in the total losses, with a corresponding increase in efficiency, or a reduction in the size of the machine with a substantial saving in cost.

It has been proposed to greatly reduce the windage loss in machines of this type by separating the rotor and stator air flows into separate ventilation systems and sealing off the rotor air flow from the air gap, as in Kilgore et al U.S. Pat. No. 3,588,557. This results in a substantial reduction in the windage loss since most of the rotor cooling air is confined to the rotor and prevented from reaching the air gap as only enough air is allowed to flow into the air gap to remove the heat resulting from the pole face losses. Separation of the rotor and stator air flows also greatly reduces the volume of air required. In the conventional cooling schemes, the stator cooling air flows first through the rotor and then across the air gap so that it is heated by the rotor losses before it reaches the stator. In order to obtain the necessary cooling of the stator, therefore, a relatively large flow of air is required. When the stator air flow is separated from the rotor air flow, however, cold air enters the stator so that the volume of air required for cooling the stator is reduced and the total air flow in the machine is greatly reduced. Since the stator air flow is largely independent of the rotor air flow, and smaller flow rates of cooler air can be used for cooling the stator, an opportunity exists for further improvement in cooling by new stator ventilation systems.

SUMMARY OF THE INVENTION

The present invention provides a new and improved ventilation system for the stators of large salient pole dynamoelectric machines in which the rotor and the stator have separate air flows which are sealed off from the air gap.

Since the stator cooling air is not supplied by air flow across the air gap, the direction of air flow in the stator core is reversed, with respect to conventional systems, and air flows from the coolers directly to the stator core and is introduced through the back, or outside, of the core to flow radially inward. The cooling air flows inward through radial vent ducts in the stator core to the region of the teeth and windings and is there directed to flow axially in longitudinal ducts in the core. These longitudinal ducts are sealed off from the air gap, so that the air does not reach the air gap, and it flows from one radial vent duct to the next through the longitudinal ducts and then radially outward to the back of the core through the adjacent vent duct. The longitudinal ducts are disposed within the core in the region of the slots and stator winding for the maximum cooling effect, and may comprise axial openings or slits in the teeth forming longitudinal passages extending between the radial vent ducts. Cold air thus flows directly from the cooler through the core to the region of the windings and returns directly to the blower and cooler so that greatly improved cooling of the stator is obtained with a smaller volume of air.

The air may be circulated by a blower of any desired type which may be carried on the rotor of the machine, or which may comprise an external blower or blowers, and the air circulates in a predetermined path through the stator, the blower and the necessary coolers. The longitudinal ducts extend from one end to the other of the stator core and communicate with the radial vent ducts. The air paths through the longitudinal ducts, however, extend only from one vent duct to the next, so that the length of each individual air path in the machine is relatively short. For this reason, the pressure drop incurred in forcing the air through the stator core is relatively low. Since the total mass flow of air required is very much lower in this system than in conventional systems, and since the pressure drop in the system is lower, the total pumping power required to maintain the air circulation is very much reduced, as compared to previous systems, with a substantial further improvement in efficiency of the machine in addition to the improvement due to reduction in windage loss and improved cooling.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
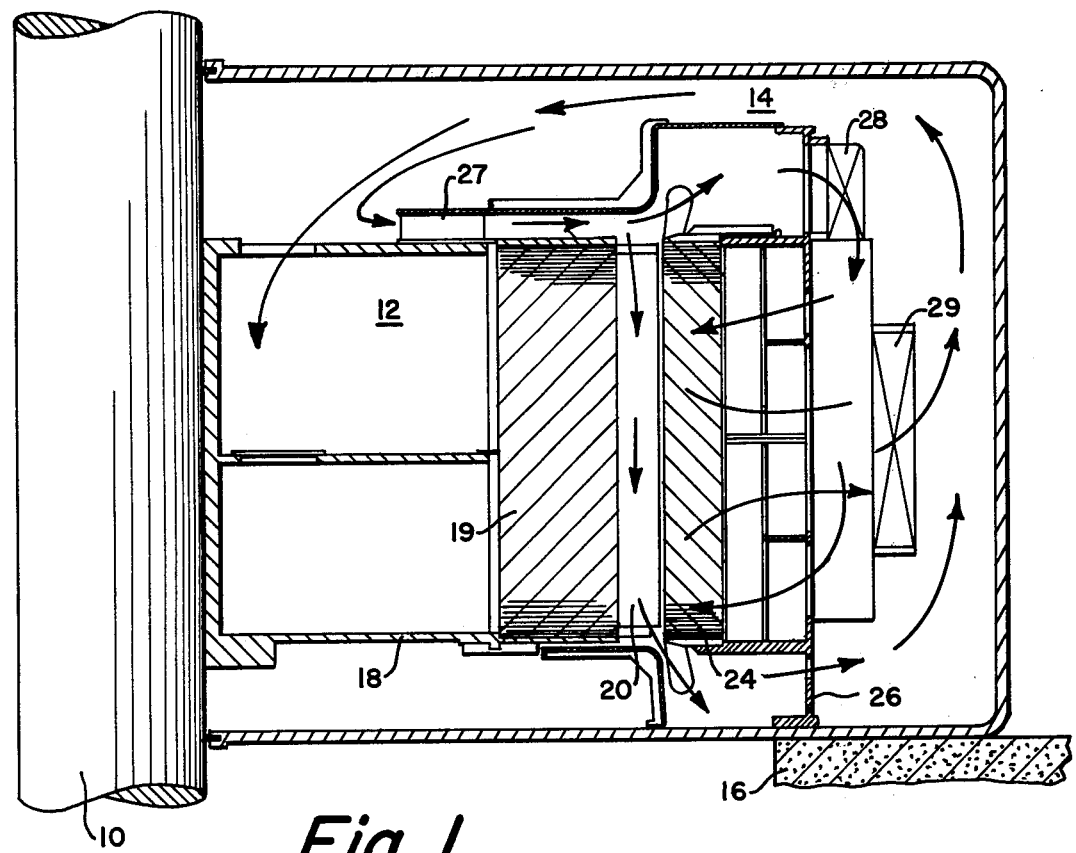
FIG. 1 is a vertical sectional view of a large dynamo-electric machine embodying the invention.

The invention is shown in the drawings embodied in a large, vertical, hydro machine suitable for use as a waterwheel driven generator or as a generator-motor for pumped storage power projects. The machine has a vertical shaft 10 carrying a rotor member 12 for cooperation with a stator 14 which is supported on a foundation 16 of any suitable type. The shaft 10 and rotor 12 are supported on a thrust bearing (not shown) of usual type and the overall construction of the machine may be of any usual or desired type.

Figure 2:
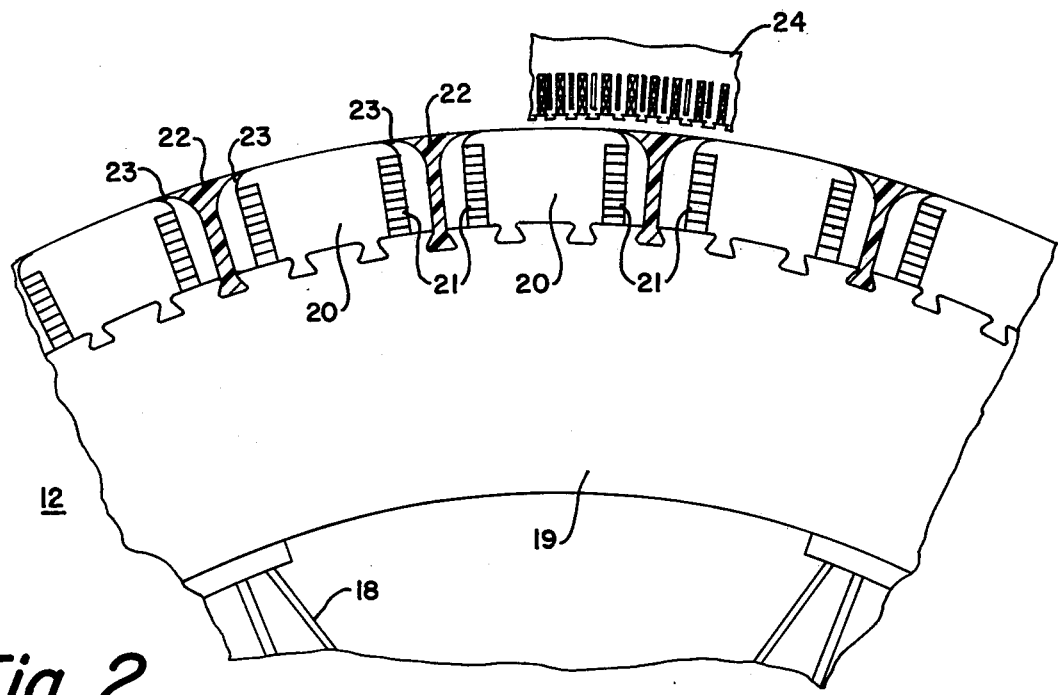
FIG. 2 is a fragmentary plan view of the rotor and stator of the machine of FIG. 1.

The rotor 12 consists of a spider portion 18 mounted on the shaft 10 and which may be of any suitable or usual construction. A laminated rim 19 is carried on the spider portion 18 and salient poles 20 carrying field windings 21 are mounted in the usual manner on the rim 19. The rotor 12 may be of any suitable construction and is cooled by its own ventilation system separate from that of the stator, the rotor air flow being sealed off from the air gap between the rotor and stator, as discussed above. For the purpose of illustration, the rotor 12 is shown as being of a type disclosed in the above-mentioned Kilgore et al patent. As shown in FIG. 2, partitions 22 extend axially through each of the interpolar spaces and have flanges 23 which engage the adjacent pole faces to seal the interpolar spaces from the air gap. The rotor is cooled by air flowing through the spider and flowing axially through the interpolar spaces, as indicated by the arrows in FIG. 1, and as more fully described in the above-mentioned patent.

The stator 14 comprises a laminated stator core 24 supported between end plates 25 in a frame 26 of any suitable construction supported on the foundation 16. The stator core 24 is of the usual laminated construction providing spaced radial vent ducts, as more fully described hereinafter, through which air may flow radially of the core. Ventilating air may be circulated through the machine by any desired means which is shown as a centrifugal blower consisting of a plurality of blades 27 mounted on the rotor. Air flows from the blower in the paths indicated by the arrows and through coolers 28 which may be of usual type, any necessary number of such coolers being provided about the circumference of the machine. The air flowing through the coolers is directed into suitable ducts for passage through the stator core 24 and, upon discharge from the stator core, is directed through the coolers 29 and discharged for recirculation by the blower and by the rotor 12. It will be understood that any suitable type of blower may be used mounted on the rotor as shown, or the necessary number of externally mounted blowers might be used to circulate the air in any desired path through coolers and the necessary ducts to and from the stator core.

Figure 4:
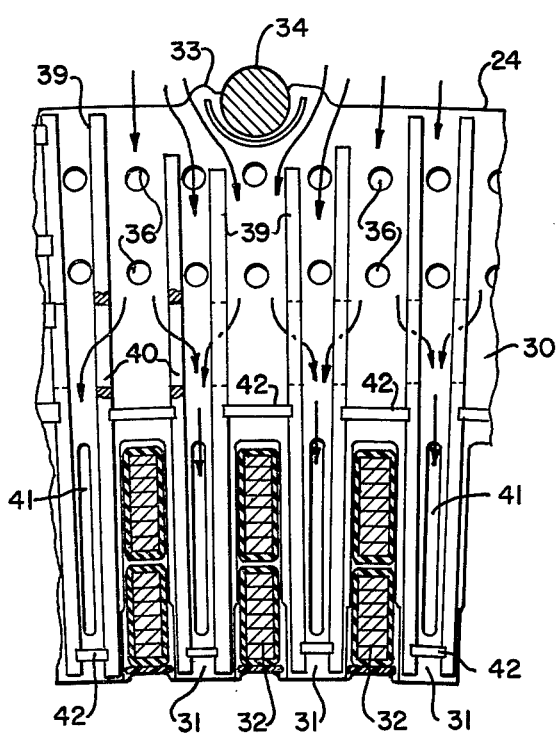
FIG. 4 is a fragmentary plan view of a portion of the stator core.
Figure 3:
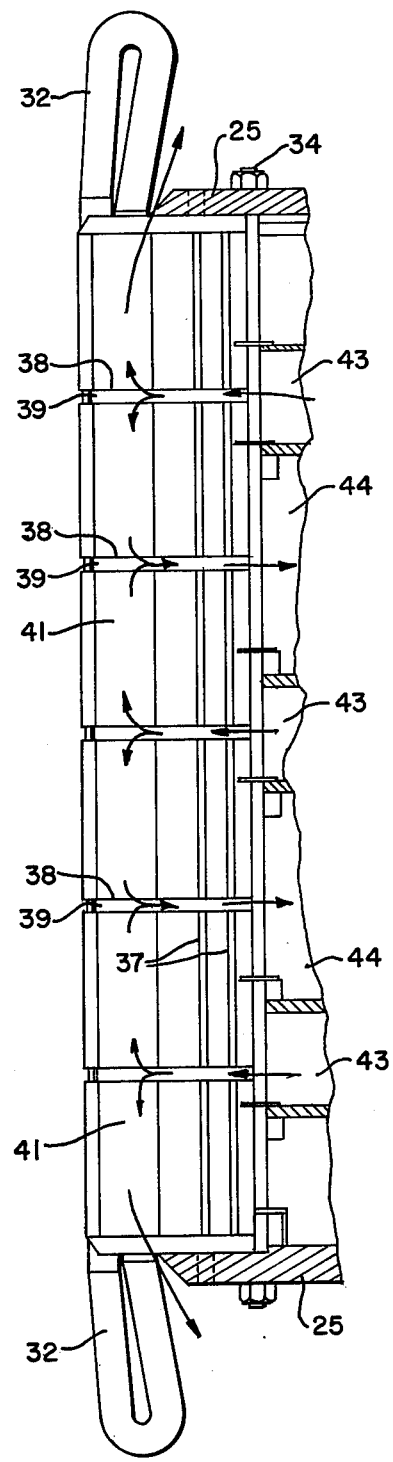
FIG. 3 is an enlarged vertical sectional view of the stator core of the machine.

As shown more particularly in FIGS. 3 and 4, the stator core 24 is of laminated construction and is built up of the usual punchings 30 to form a cylindrical core having a central bore therethrough with teeth 31 extending longitudinally of the bore to form slots between them for the reception of stator windings 32. The stator punchings 30 may be of usual type having recesses 33 at the outer periphery for reception of building bolts 34 on which the core is supported in the frame 26, and if desired openings 36 may be provided in the punchings to form axial ducts 37 through the core for passage of ventilating air. The stator core 24 is provided with a plurality of longitudinally-spaced radial vent ducts 38 extending radially through the core from the central bore to the outer periphery. The vent ducts 38 are provided by attaching spacing fingers 39 to certain of the punchings 30 at the desired intervals in the core to space the adjacent punchings apart and thus form radial ducts 38.

The spacing fingers 39 also serve as air guides, and in the embodiment of the invention shown in FIG. 4, the fingers 39 extend radially of the punchings and have openings in them indicated at 40 through which air may flow to the tooth region. The teeth 31 have elongated duct openings or slits 41 formed in them extending over most of the radial length of the tooth so that when assembled in the complete core, the slits 41 form longitudinal ducts. These ducts extend for the full axial length of the teeth from one end of the core to the other, and thus extend between adjacent vent ducts 38 with which they are in communication. Sealing means are also provided to seal the air flow path from the air gap and prevent the escape of any appreciable amount of air. As shown in FIG. 4, sealing members 42 may be provided for this purpose adjacent the tips of the teeth 31 and across the bottom of the winding slots. The sealing members 42 may be rigid bars received in slots in the adjacent spacing fingers 39 so that the vent duct 38 is effectively sealed off from the air gap.

In operation, ventilating air flows through the core generally as shown by the arrows in FIGS. 3 and 4. In this particular embodiment, alternating cold air ducts 43 and warm air ducts 44 are provided in the area immediately adjacent the back of the stator core. Cold air from the coolers 28 is directed into the cold air ducts 43 and flows into alternate vent ducts 38 and radially inward through the core to the tooth region, the spacing fingers 39 acting as guides to direct the air. The ducts 38 are sealed at the air gap as described above and the air flowing inward is forced to change direction and flow longitudinally into the ducts 41 which extend through the teeth. The air thus flows longitudinally in opposite directions in these ducts to the next adjacent vent duct 38 on each side where opposing air streams meet. The air then again changes direction and flows radially outward through the vent duct to a warm air duct 44 at the back of the core from which it is directed through the coolers 29 and back to the blower.

Figure 5:
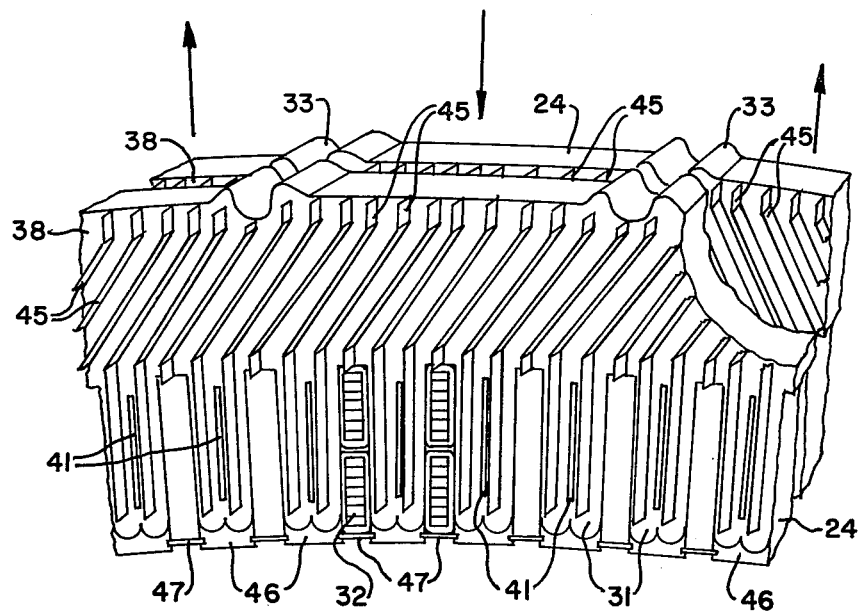
FIG. 5 is a somewhat diagrammatic perspective view of a portion of the stator core showing the air flow through the ducts of the core.
Figure 6:
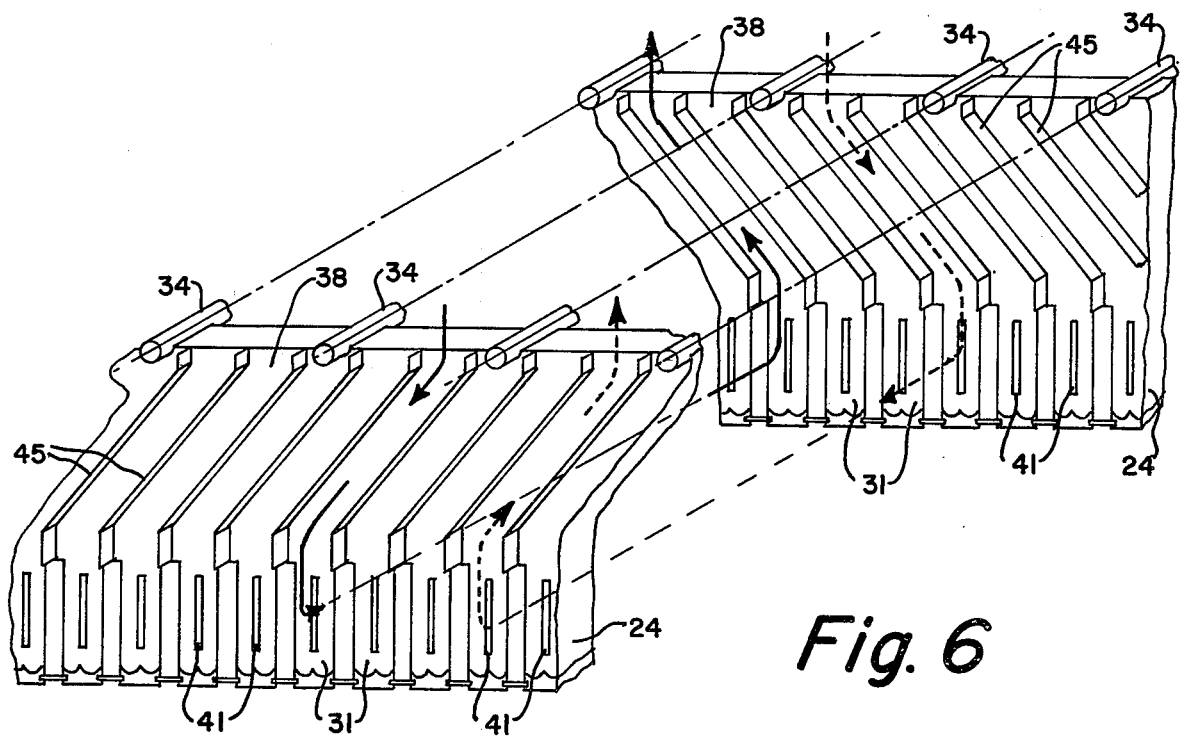
FIG. 6 is a diagrammatic perspective view further illustrating the air flow of FIG. 5.

In the embodiment of the invention just described, the ventilating air flows radially inward through alternate vent ducts 38 and outward through the remaining ducts. This requires the provision of alternating cold air and warm air ducts extending around the outside of the core which may, in some cases, be undesirable. Another arrangement is shown in FIGS. 5 and 6 which may result in a simpler arrangement of ductwork in many cases. The stator core 24 there shown is essentially the same as that described above. The vent ducts 38 are formed in the same manner by spacers 45 attached to the punchings at intervals and the longitudinal ducts 41 extend through the teeth 31 as previously described. In this embodiment, the radially inner ends of the vent ducts are sealed by wedge members 46 fitting in the vent ducts between the tooth tips and having curved surfaces to facilitate the change in direction of the air. The usual slot wedges 47 which retain the winding coils are used to seal the slots so that the vent ducts 38 are sealed off from the air gap as before.

In this embodiment of the invention, each vent duct 38 is divided into a plurality of circumferential zones corresponding in extent to the spaces between adjacent building bolts 34. These circumferential zones are alternately inlet zones and discharge zones for the cooling air, as indicated by the arrows in FIG. 5, which in many cases results in a simpler arrangement of cold air and warm air ducts, although any suitable arrangement of ducts may, of course, be used. In order to accomplish the desired air flow, the spacers 45 are radial in the tooth portions of the core and are bent to extend at an acute angle to the radial direction through the rest of the core. The spacers 45 of adjacent vent ducts are inclined in opposite directions with respect to the radial as can be seen in FIG. 5.

The resulting air flow paths are shown diagrammatically in FIG. 6 in which one flow path is shown by solid arrows and another flow path is shown by dotted arrows, three of the circumferential zones being shown. Thus, air entering the front or forward duct of FIG. 6 in the center zone (solid arrows) is shifted to the left by the inclined spacers 45 and flows to the teeth where it enters the longitudinal ducts 41. The air flows in both directions through these ducts, the rearward flow being shown. When the air reaches the next adjacent (rearward) vent duct 38, it meets oppositely flowing air and both streams flow radially outward into the vent duct. Since the spacers 45 in this duct are oppositely inclined, they shift the air farther to the left and it is discharged through the left-hand circumferential zone of FIG. 6. The path of air entering the rearward vent duct in the center zone is shown by the dotted arrows. This air flows oppositely to the previously-described air flow and is shifted to the right by the spacers 45 to discharge from the forward vent duct through the right-hand zone.

It will be seen that in both embodiments of the invention, the stator core and windings are cooled by air flowing in a path which is sealed from the air gap and separate from the rotor cooling air path. Cool air flows radially inward from the back of the core, longitudinally through ducts closely adjacent the windings where the greatest amount of heat is generated, and radially outward to be discharged through the back of the core. The length of each longitudinal duct between adjacent radial ducts is relatively short and air flows through the core in many short paths in parallel. This results in a relatively small pressure drop across the core so that the fan pressure difference required is relatively low. Since the air is cold as it enters the stator core and is required to absorb only the heat generated in the stator, a much smaller volume of air is required than was necessary in previous ventilation systems in which the air flowed first through the rotor and then across the air gap into the stator so that the air was first heated by the rotor. The small volume of air required, together with the relatively low pressure drop across the core ducts, results in a great reduction in the pumping power required to circulate air through the machine as compared to conventional cooling systems, with a corresponding increase in efficiency, while the improved cooling permits an increase in rating of the machine or a decrease in size.

It will now be apparent that a greatly improved cooling system has been provided for salient pole machines in which separate cooling systems are provided for the stator and rotor. The new stator cooling system disclosed herein results in a very marked improvement in the stator cooling, and a reduction in pumping power required, with a substantial improvement in efficiency. It will be understood, of course, that various modifications and embodiments of the invention are possible. The longitudinal ducts may be arranged in any suitable manner within the core where they can be sealed from the air gap and disposed in the immediate region of the winding slots and windings. The external air circuit outside of the stator core may be arranged in any desired or suitable manner to cool and recirculate the air.

What is claimed is:

1. A dynamoelectric machine having a stator member and a rotor member separated by an air gap, said rotor member having salient poles and a ventilation system sealed off from the air gap, said stator member including a cylindrical stator core having a central bore with teeth extending longitudinally of said bore to form slots for stator windings, a plurality of longitudinally-spaced vent ducts extending radially through the core, a plurality of longitudinal ducts in said teeth of said core and extending between said vent ducts, means for sealing said longitudinal ducts and said vent ducts from the air gap, and means for causing ventilating gaseous fluid to flow radially inward in a first group of said plurality of vent ducts and longitudinally in both directions in said longitudinal ducts from said first group to vent ducts of a second group of said plurality of vent ducts and radially outward in said second group, said first group of vent ducts being alternately disposed in the longitudinal direction with ducts of said second group.

2. A dynamoelectric machine having a stator member and a rotor member separated by an air gap, said rotor member having salient poles and a ventilation system sealed off from the air gap, said stator member including a cylindrical stator core having a central bore with teeth extending longitudinally of said bore to form slots for stator windings, a plurality of longitudinally-spaced vent ducts extending radially through the core, a plurality of longitudinal ducts in said teeth of said core and extending between said vent ducts, means for sealing said longitudinal ducts and said vent ducts from the air gap, and means for causing ventilating gaseous fluid to flow radially inward in a first group of said plurality of vent ducts and longitudinally in both directions in said longitudinal ducts from said first group to vent ducts of a second group of said plurality of vent ducts and radially outward in said second group, each vent duct having circumferentially alternating zones separated from each other for inward and outward fluid flow, the fluid flowing in each of said inward zones flowing longitudinally through a longitudinal duct and to an outward zone of an adjacent vent duct.

3. A dynamoelectric machine having a stator member and a rotor member separated by an air gap, said rotor member having salient poles and a ventilation system sealed off from the air gap, said stator member including a cylindrical stator core having a central bore with teeth extending longitudinally of said bore to form slots for stator windings, a plurality of longitudinally-spaced vent ducts extending radially through the core, a plurality of longitudinal ducts in said core teeth extending between said vent ducts, means for sealing said longitudinal ducts and said vent ducts from the air gap, and means for causing ventilating gaseous fluid to flow radially inward in a first group of said plurality of vent ducts and longitudinally in both directions in said longitudinal ducts from said first group to vent ducts of a second group of said plurality of vent ducts and radially outward in said second group, so that ventilating fluid enters the core flowing radially inward in a vent duct, longitudinally in said longitudinal ducts to the next adjacent vent duct, and radially outward in said next vent duct, and said means for causing ventilating fluid flow includes blower means for causing said ventilating fluid to flow through the stator core and for causing fluid to flow in a separate path through the rotor member, and cooler means disposed in the path of said fluid flowing through the stator core.

4. A stator member for a dynamoelectric machine including a laminated cylindrical stator core having a central bore with teeth extending longitudinally of the core to form slots for stator windings, certain of the laminations of the core having spacing means thereon to form vent ducts extending radially through the core at spaced intervals, a plurality of longitudinal duct means in the core teeth extending between adjacent vent ducts, and said spacing means being disposed to define flow paths for ventilating air flowing radially inward in certain of said vent ducts from which said air flows in both longitudinal directions through said longitudinal duct means to certain others of said vent ducts from which said air flows radially outward, means for preventing flow of air between said ducts and said bore, and a plurality of longitudinal bolts on the outer periphery of the core for supporting the core laminations, said bolts being circumferentially spaced and dividing each vent duct into a plurality of circumferential zones, said spacing means defining flow paths for air entering the core through alternate zones of each vent duct to flow radially inward to said longitudinal ducts, through the longitudinal ducts to the next adjacent vent ducts, and radially outward through alternate zones of said adjacent ducts.

* * * * *